(12) United States Patent
Sato et al.

(10) Patent No.: US 11,004,610 B2
(45) Date of Patent: May 11, 2021

(54) METHOD FOR MANUFACTURING MULTILAYER ELECTRONIC COMPONENT

(71) Applicant: TDK CORPORATION, Tokyo (JP)

(72) Inventors: Jun Sato, Tokyo (JP); Yukari Wada, Tokyo (JP); Koki Shinozawa, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 16/284,677

(22) Filed: Feb. 25, 2019

(65) Prior Publication Data

US 2019/0267192 A1 Aug. 29, 2019

(30) Foreign Application Priority Data

Feb. 26, 2018 (JP) .............................. JP2018-032184

(51) Int. Cl.
| | |
|---|---|
| *H01G 4/30* | (2006.01) |
| *H01G 4/008* | (2006.01) |
| *H01G 4/12* | (2006.01) |
| *H01G 4/20* | (2006.01) |
| *B32B 18/00* | (2006.01) |
| *C04B 35/64* | (2006.01) |

(52) U.S. Cl.
CPC .............. *H01G 4/30* (2013.01); *B32B 18/00* (2013.01); *C04B 35/64* (2013.01); *H01G 4/008* (2013.01); *H01G 4/12* (2013.01); *H01G 4/20* (2013.01); *C04B 2235/6562* (2013.01); *C04B 2237/704* (2013.01); *H01G 4/306* (2013.01)

(58) Field of Classification Search
CPC .......... H01G 4/30; H01G 4/306; B32B 18/00; C04B 35/64
See application file for complete search history.

(56) References Cited

U.S. PATENT DOCUMENTS

| | | | | |
|---|---|---|---|---|
| 5,340,617 A | * | 8/1994 | Fasano ................ | C04B 41/009 399/168 |
| 2002/0075632 A1 | * | 6/2002 | Nakano ................ | H01G 4/232 361/320 |

(Continued)

FOREIGN PATENT DOCUMENTS

| | | | |
|---|---|---|---|
| JP | 53145058 A | * | 12/1978 |
| JP | H09-232174 A | | 9/1997 |

(Continued)

OTHER PUBLICATIONS

Imai et al. "JP 10-006443 A machine tranlation", published Jan. 13, 1998 (Year: 1998).*

(Continued)

*Primary Examiner* — Alex B Efta
(74) *Attorney, Agent, or Firm* — Oliff PLC

(57) ABSTRACT

A method for manufacturing a multilayer electronic component having an element body in which a functional part and a conductor part are laminated. The green multilayer body 11 is formed on the temporary holding film 62 formed on the release substrate. The green multilayer body 11 is formed by repeating the first step forming a green functional part using the first ink containing the functional particles and the second step forming the green conductor part using the second ink containing the conductive particles. The temporary holding film 62 has conductivity.

17 Claims, 6 Drawing Sheets

(56) References Cited

U.S. PATENT DOCUMENTS

| | | | | |
|---|---|---|---|---|
| 2006/0292496 A1* | 12/2006 | Furukawa | .............. | B33Y 80/00 |
| | | | | 430/311 |
| 2007/0134459 A1* | 6/2007 | Hubert | .................. | G02B 1/105 |
| | | | | 428/40.1 |
| 2009/0053528 A1* | 2/2009 | Okuya | .................... | B29C 33/68 |
| | | | | 428/421 |
| 2015/0332853 A1 | 11/2015 | Kageyama et al. | | |

FOREIGN PATENT DOCUMENTS

| | | | | |
|---|---|---|---|---|
| JP | 10006443 | A | * | 1/1998 |
| JP | 2015-216319 | A | | 12/2015 |
| KR | 2005041780 | A | * | 5/2005 |

OTHER PUBLICATIONS

Fujitsu, "JP 53-145058 A machine translation", published Dec. 16, 1978 (Year: 1978).*

* cited by examiner

METHOD FOR MANUFACTURING MULTILAYER ELECTRONIC COMPONENT

BACKGROUND OF THE INVENTION

The present invention relates to a method for manufacturing a multilayer electronic component.

Many and various electronic components are mounted on electronic devices for information processing, signal conversion, etc., or in power supply circuits and the like. As such electronic components, the multilayer electronic component, having a structure in which functional layers exhibiting the properties of the electronic component and electrode layers electrically connected to terminals are laminated, is known.

In recent years, higher performance, miniaturization, etc. are also required for electronic components due to the demand for high performance, miniaturization and the like of electronic devices. As the electronic components are miniaturized, the ratio (yield) of the number of the manufactured electronic components satisfying a predetermined standard (performance) sharply decreases. This is because as the size of the electronic component is reduced, the formation accuracy of a multilayer body deteriorates, greatly affecting properties (performances) of the electronic component, and the number of electronic components having properties within the predetermined maximum tolerance decreases.

As a method of manufacturing a conventional multilayer electronic component, a method using a method called "roll-to-roll" in which a predetermined pattern is formed on a plastic film using a printing technique to obtain an element is exemplified.

Specifically, a sheet is formed on a plastic film using slurry containing a material constituting a functional layer, and an electrode is printed on the sheet using a paste containing a conductive material constituting an electrode layer. Subsequently, the sheet on which the electrodes are formed is laminated to obtain a green compact in which the sheet and the electrode are laminated. Then, the resultant green compact is cut as required, separated, and then subjected to a heat treatment, whereby a multilayer electronic component is manufactured.

However, with the above described method, a positional displacement of the electrodes is liable to occur at the time of lamination and at the time of cutting, which is a factor of deteriorating the formation accuracy of the multilayer structure of the functional layer and the electrode layer in the obtained multilayer electronic component.

Further, there is a limit in improving the forming accuracy by the conventional roll-to-roll method, and in particular, there is a problem that the properties (for example, the electrostatic capacity in the multilayer ceramic capacitor, the electric resistance in the NTC thermistor, etc.) of the small sized multilayer electronic component is difficult to keep within a predetermined standard level, and as a result, the yield is lowered.

As a method for improving the forming accuracy, for example, the following Patent Document 1 discloses a method of manufacturing a multilayer electronic component in which a ceramic layer and an electrode layer are formed by jetting liquid droplets using a ceramic slurry and a functional material paste containing a conductive material by an ink jet method. According to this method, it is described that the positional displacement can be suppressed, and the lamination step and the cutting step are unnecessary.

The following Patent Document 2 discloses an ink suitable for manufacturing a multilayer electronic component by jetting liquid droplets using an ink jet system.

However, when the green multilayer body is drawn directly on the flat medium such as conventionally used PET film or metal plate using the techniques of Patent Document 1 and Patent Document 2, bleeding, repelling, etc. of the ink may occur, the drawability may become inferior, or the drawn multilayer body may stick to the medium. Thus, it was difficult to form the green multilayer body in a desired shape.

Also, when releasing the green multilayer body from the medium, the green multilayer body may be damaged. Therefore, in order to release the medium while avoiding breakage of the green multilayer body, it is necessary to divide the green multilayer body to form green chips and then to release individually, resulting that the process becomes complicated.

Patent Document 1: JP H09-232174 A
Patent Document 2: JP 2015-216319 A

BRIEF SUMMARY OF INVENTION

The present invention has been made in view of the above circumstances and an object thereof is to provide a manufacturing method of a multilayer electronic component having an element body in which a functional part and a conductor part are laminated, the method being required in a simplified step with extremely good accuracy in forming the multilayer body.

As a result of extensive research to achieve the above object, the present inventors have found that by forming a green multilayer body on a temporary holding film (having conductivity), it is possible to manufacture the multilayer electronic component with high forming accuracy while simplifying the process.

Namely, the method for manufacturing the multilayer electronic component according to the present invention is, a method for manufacturing a multilayer electronic component having an element body in which a functional part and a conductor part are laminated, including a step of forming a green multilayer body on a temporary holding film, wherein, the green multilayer body is formed by repeating a first step of forming a green functional part using a first ink containing a functional particle and a second step of forming a green conductor part using a second ink containing a conductive particle, and the temporary holding film has conductivity.

According to the manufacturing method of the multilayer electronic component of the invention, by forming the green multilayer body on the temporary holding film, bleeding or repelling of the ink can be reduced and an excellent forming accuracy can be secured. In addition, it is possible to reduce sticking of the sintered multilayer body onto a heat resistant substrate such as a setter.

In addition, according to the method of the invention, the green multilayer body can be transferred while being disposed on the temporary holding film. Further, since the temporary holding film can be burned off in the course of heat treatment, it is not necessary to separate the green multilayer body from the temporary holding film before the heat treatment step, and the process can be simplified.

Furthermore, according to the method of the invention, in the step of transferring the green multilayer body together with the temporary holding film to the heat resistant substrate, the green multilayer body can be easily transferred onto the heat resistant substrate such as a setter without causing breakage or the like in the temporary holding film.

Furthermore, it is possible to form the green functional parts and the green conductive parts to form separated patterns respectively, corresponding to the shape and size of the element body after firing. Therefore, since the green multilayer body is formed as a green chip corresponding to the shape and size of the element body, it is possible to omit a step of cutting and dividing the green multilayer body into plural green chips.

Particularly, according to the method of the present invention, since the temporary holding film has conductivity, prevention of charging the temporary holding film can be realized. Therefore, when the temporary holding film, on which the green multilayer body is formed in a predetermined pattern, is released from such as a release substrate, the temporary holding film can be easily released from the release substrate. And it is possible to effectively prevent a release residue, such as the temporary holding film with the green multilayer body remaining on the release substrate. In particular, since the surface of the temporary holding film having conductivity is difficult to be charged, it is possible to efficiently produce a green multilayer body of a predetermined pattern on the temporary holding film with high response and high accuracy by an electrostatic attraction method.

Preferably, the temporary holding film is formed of a resin film containing particles having conductivity, such as carbon particles. By dispersing the particles having conductivity in the resin film formed on the release substrate, the surface charge can be suppressed, and the yield of the release can be further improved. In addition, by containing the particles having conductivity such as carbon particles in the resin film, the resin film is controlled to have a porous structure (structure including pores), a suitable unevenness is formed on the surface, a fixation of the first or the second ink land onto the surface is improved, and an occurrence of the ink bleeding is also suppressed.

Preferably, the sheet resistance of the temporary holding film is 10 M$\Omega$/$\square$(M$\Omega$ per square) or less. In the case of such sheet resistance, the operation and effect of the invention is large.

A step of releasing the temporary holding film with the green multilayer body from a release substrate, after forming the green multilayer body on the temporary holding film formed on the release substrate may be included.

The release substrate may be a metal plate. Further, the breaking strength of the temporary holding film may be 1 N/m or more and the breaking elongation may be 3% or more.

The temporary holding film may include at least one selected from a group including an acrylic resin, a butyral resin, a cellulose resin, a polyvinyl alcohol resin, and an epoxy resin.

The temporary holding film may be formed on the release substrate by using either a screen printing, a spin coating, a blade method, or a dipping method.

The green functional parts and the green conductor parts may be separated patterns, respectively corresponding to the shape and size of the element body after firing.

The green multilayer body formed on the temporary holding film may be heat treated together with the temporary holding film, and the temporary holding film may be thermally decomposed.

DETAILED DESCRIPTION OF INVENTION

Figure 1:
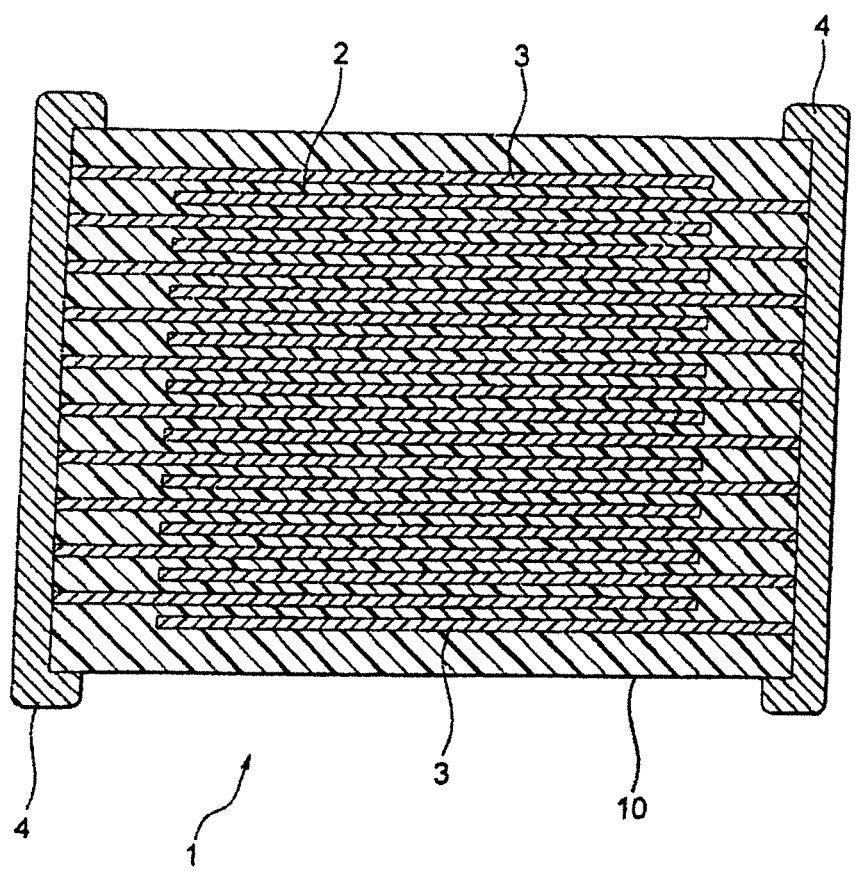
FIG. 1 is a schematic cross sectional view of a multilayer ceramic capacitor as an example of the multilayer electronic component manufactured by the manufacturing method according to the embodiment.

Hereinafter, the present invention will be described in detail based on embodiments shown in the drawings.

(Multilayer Electronic Component)

Figure 2:
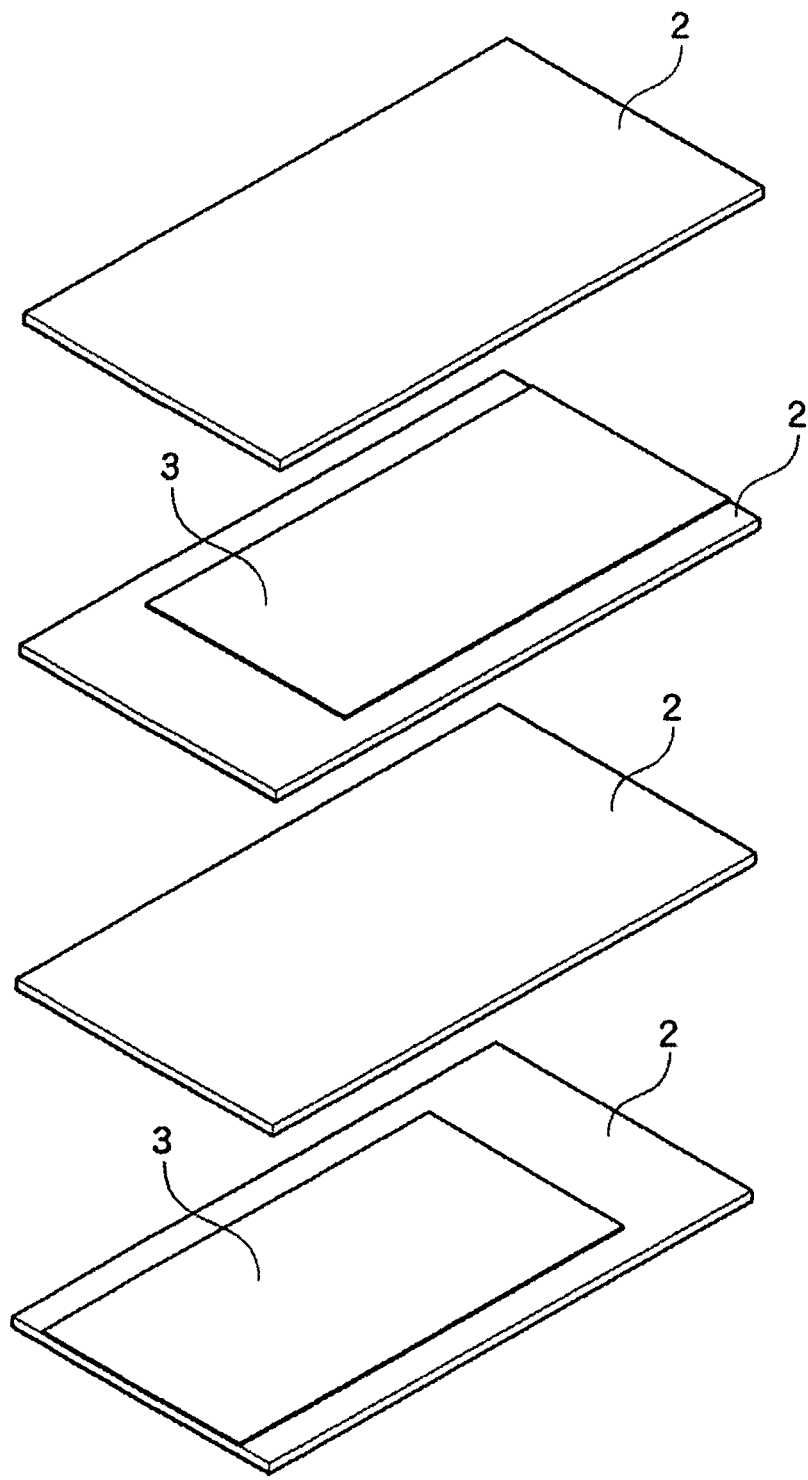
FIG. 2 is a disassembled perspective view showing the multilayer structure of the element body included in the multilayer ceramic capacitor as an example of a multilayer electronic component manufactured by the manufacturing method according to the embodiment.

FIG. 1 shows the multilayer ceramic capacitor as an example of the multilayer electronic component manufactured by the manufacturing method according to the embodiment. The multilayer ceramic capacitor 1 has the element body 10. As shown in FIGS. 1 and 2, the element body 10 is constituted by alternately laminating a rectangular functional part (ceramic layer 2) and a rectangular conductor part (internal electrode layer 3). The conductor part is formed smaller than the functional part in both a short side direction and a long side direction. At both end parts of the element body 10, there are formed a pair of terminal electrodes 4, which are electrically connected to the internal electrode layers 3 alternately arranged inside the element body 10.

By applying voltage to these terminal electrodes, the ceramic layer disposed between the electrode layers exhibiting different polarities exerts a predetermined dielectric property, and as a result, it functions as a capacitor.

The shape and size of the multilayer electronic component may be appropriately determined according to the purpose and the application. According to the embodiment, the shape is a rectangular parallelepiped shape. In addition, the size is preferable to be small. In the case of the multilayer ceramic capacitor, it is particularly effective when the size is such as a vertical (0.4 mm or less)×a width (0.2 mm or less)×a thickness (0.1 to 0.2 mm or less).

(Manufacturing Method of Multilayer Electronic Component)

Subsequently, an example of the manufacturing method according to the embodiment will be described in detail below. According to the manufacturing method of the embodiment, the green multilayer body is formed on the temporary holding film. The method for forming the green multilayer body on the temporary holding film is not particularly limited as long as it is a method of directly drawing the green multilayer body on the temporary holding film, however, an ink jet method or a dispenser method is preferable. As the inkjet method, a piezo method in which ink droplets are ejected by deforming an ink flow path by vibrating a piezoelectric element, a thermal method in which a heating element is provided in the ink flow path, the heating element is caused to generate heat to generate bubbles, and then ink droplets are ejected in accordance with a pressure change in the ink flow path due to the bubbles, an electrostatic attraction method in which ink in the ink flow path is charged and ink droplets are ejected by electrostatic attraction of the ink, etc. are exemplified. As the dispenser method, a method using an air pressure can be cited.

Hereinafter, as a manufacturing method according to the embodiment, a method of forming a green multilayer body by ejecting ink by the electrostatic attraction method will be described in detail. In the electrostatic attraction method, a green functional part to be the functional part and a green conductor part to be the conductive part are formed by printing using an ejecting apparatus utilizing the electrostatic attraction force. First, the ejecting apparatus will be described.

(Ejecting Apparatus)

The ejecting apparatus includes a plurality of nozzles as an ejection part and a voltage applying means. The ejecting apparatus is composed of at least a first head part having a plurality of nozzles to which the first ink is supplied and a second head part having a plurality of nozzles to which the second ink is supplied. In the embodiment, a method of ejecting ink onto the temporary holding film 62 formed on the release substrate 61 shown in FIG. 4 to draw a pattern will be described in detail.

In the ejecting apparatus that uses the electrostatic attraction force, since the ink is charged and the start and the stop of the ejection of the charged ink are controlled by the electrostatic attraction force, the start and the stop of the ejection respond very quickly and accurately. Therefore, when voltage is applied, ink is ejected immediately to the object to be drawn, and when the voltage application is stopped, ejection of ink stops immediately without causing dripping or the like and making it possible to draw a predetermined pattern repeatedly with good reproducibility.

(Ink)

In the embodiment, as the ink used in the above described ejecting apparatus, the first ink for forming the green functional part to configure the functional part and the second ink for forming the green conductor part to configure the conductive part are used. Hereinafter, the first ink and the second ink will be described.

(First Ink)

According to the embodiment, the first ink preferably contains the functional particle, a solvent and a resin. The method of preparing the first ink is not particularly limited, but for example, a resin solution may be prepared by dissolving the resin in a solvent, and the resin solution and the functional particles may be mixed. In the first ink, the functional particles are dispersed in the resin solution.

The functional particles are not particularly limited as long as it is a material constituting the functional part or a compound to be a material of the functional part, and it is appropriately selected according to such as the application. For example, when the material constituting the functional part is ceramic, particles composed of the ceramic or particles such as carbonate, nitrate, hydroxide, organometallic compound, etc. or the like to be the ceramic by such as the heat treatment are exemplified. Further, for example, when the material constituting the functional part is a metal or an alloy, particles composed of the metal or alloy are exemplified. Specifically, when a multilayer ceramic capacitor is formed as an electronic part, $BaTiO_3$, $CaTiO_3$ $SrTiO_3$, etc. can be used as the functional particles.

The resin contained in the first ink is not particularly limited, and examples thereof include resins such as a cellulose resin, a butyral resin, an acrylic resin, a polyvinyl alcohol, an epoxy resin, a phenol resin, a styrene resin, an urethane resin, etc. The solvent contained in the first ink is also not particularly limited, and water or an organic solvent are exemplified. Specific organic solvents exemplify aliphatic hydrocarbons such as decane, tetradecane and octadecane, ketones such as methyl ethyl ketone and cyclohexanone, aromatic hydrocarbons such as xylene and toluene, ethers such as methyl cellosolve, butyl cellosolve, methyl carbitol, butyl carbitol and triethylene glycol monoethyl ether, esters such as ethyl acetate and butyl carbitol acetate, alcohols such as propanol, ethylene glycol and terpineol, and polar solvents such as dimethylsulfoxide, N-methylpyrrolidone and dimethylacetamide. Examples of the organic solvents are used singly or in combination of two or more.

Note, the first ink may contain dispersants, plasticizers, dielectrics, glass frits, insulators, antistatic agents, etc., when necessary.

(Second Ink)

In the embodiment, the second ink preferably includes the conductive particle, a solvent, and a resin. The method for preparing the second ink is not particularly limited, but it may be the same as the method for preparing the first ink.

The conductive particles are not particularly limited as long as they are particles of a material constituting the conductive part or a compound to be the material of the conductive part, and is appropriately selected according to compatibility with the material constituting the functional part, the use, etc. For example, in the case of forming the multilayer ceramic capacitor as an electronic component. Ni, Ni alloy, Pd, AgPd, etc. can be used as the conductive particles.

In the embodiment, in addition to the first ink and the second ink, a third ink may be used. The third ink may be the same or may have different components or compositions as the first ink or the second ink. In the case of using the third ink, the ejecting apparatus has a third head part including a plurality of nozzles to which the third ink is supplied.

(Manufacturing Process)

In the embodiment, preferably, a temporary holding film is formed on the release substrate (the step of forming the temporary holding film on the release substrate). And, by using the above described ejecting apparatus, the green functional part is printed and formed onto the temporary holding film or the green conductor part by the first ink (the first step), and a green conductor part is printed and formed onto the formed green functional part by the second ink (the second step). These processes are repeated to obtain a green multilayer body in which the green functional part and the green conductor part are alternately stacked. Further, the temporary holding film is released from the release substrate together with the green multilayer body. Then, the green multilayer body is heat treated together with the temporary holding film to obtain the element body. Each step will be described below.

(Step of Forming the Temporary Holding Film on the Release Substrate)

Figure 4:
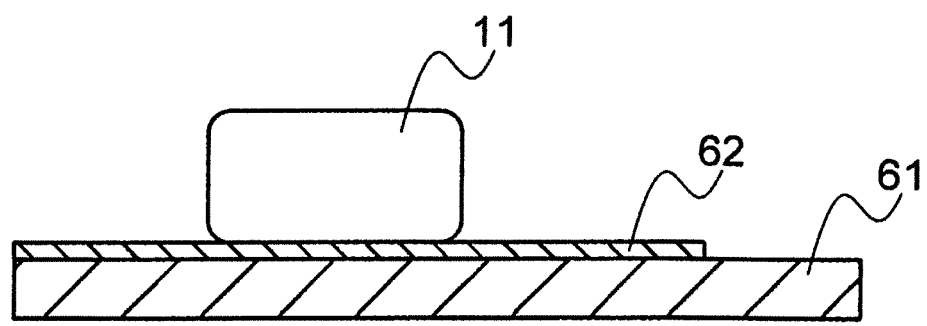
FIG. 4 is a schematic diagram showing a green multilayer body, a temporary holding film and a release substrate according to the embodiment.

According to the embodiment, as shown in FIG. 4, the temporary holding film 62 is formed on the release substrate 61, and the green functional part and the green conductive part are formed on the temporary holding film 62 to form the green multilayer body 11.

As a method for forming the temporary holding film 62 on the release substrate 61, for example, slurry containing the material constituting the temporary holding film 62 is applied to the release substrate 61 by the screen printing, the spin coating, the blade method, or the dipping method are exemplified. By forming the temporary holding film 62 by the above method, it is possible to obtain the temporary holding film 62 having adhesiveness with the release substrate 61.

The material constituting the temporary holding film 62 is not particularly limited as long as it is a material having smoothness and thermal decomposability, however, it preferably includes a resin. The temporary holding film 62 may contain materials and additives other than the resin. And the temporary holding film 62 of the embodiment preferably has the sheet resistance of 10 MΩ per square or less, more preferably 1 MΩ per square or less and shows conductivity.

A method for providing conductivity to the temporary holding film 62 is not particularly limited, and the following method is exemplified. Particles having conductivity (fillers having conductivity) such as carbon particles are dispersed in a resin film to be the temporary holding film. The particle diameter of the carbon particles contained in the resin film is not particularly limited, however, it is preferably 0.02 to 2 μm.

Examples of the fillers having conductivity other than the carbon particles which may be contained in the resin film include polymers having conductivity, CNT, etc. The volume percentage of the fillers having conductivity such as carbon particles contained in the resin film is not particularly limited, but it is preferably from 30 to 80 volume %.

The temporary holding film 62 according to the embodiment preferably includes one or more resins selected from the group including the acrylic resin, the butyral resin, the cellulose resin, the polyvinyl alcohol resin, and the epoxy resin. In addition, the temporary holding film 62 may contain the resin used for the green functional part and the green conductive part of the green multilayer body 11 described above. Since the temporary holding film 62 is made of a resin film containing the above material, thermal decomposability, smoothness and strength can be secured.

In the embodiment, the breaking strength of the temporary holding film 62 is preferably 1 N/m or more, more preferably 3 N/m or more, and further preferably 10 N/m or more. The breaking strength of the temporary holding film 62 is measured in accordance with JIS-C-2151 or ASTM-D-882, and specifically, it is measured as follows. That is, using a tension tester, the test piece is pulled at a speed of 200 mm/min., and the tensile load value (unit is N) when the test piece broke is divided by the width (unit is m) of the test piece, and the obtained value is referred as the breaking strength.

Further, in the embodiment, the break elongation of the temporary holding film 62 is preferably 3% or more, and more preferably 5% or more. The break elongation of the temporary holding film 62 is measured according to JIS-C-2151 or ASTM-D-882, and specifically, it is measured as follows. That is, using the tension tester, the test piece is pulled at a speed of 200 mm/min., the elongation of the test piece when the test piece broke is measured, and the break elongation (%) is calculated by the following formula.

The break elongation (%)=100×(*L*−*L*0)/*L*0

L0: length of test piece before test
L: length of test piece at break

In the embodiment, the thickness of the temporary holding film is preferably 1 to 100 μm, and more preferably 3 to 50 μm. By setting the thickness of the temporary holding film within the above range, it is easy to secure the strength of the temporary holding film.

In the embodiment, the release substrate is not particularly limited as long as the substrate has a surface smoothness enough to form the temporary holding film on the substrate and release the film from the substrate, A metal plate, a glass plate, a ceramic plate, and a silicon single crystal substrate are exemplified as the substrate, and the metal plate is preferable. Examples of the metal plate material include stainless steel, aluminum, and the like. By forming the temporary holding film 62 on such release substrate 61, the temporary holding film 62 can be easily released from the release substrate 61. In the embodiment, since the release substrate 61 is not heat treated, heat resistance property is not required for the release substrate 61. However, it is preferable to use the release substrate 61 having heat resistance property when the green multilayer body 11 on the temporary holding film 62 is heat treated without releasing the temporary holding film 62 from the release substrate 61.

In the embodiment, the release substrate 61 preferably has a planar shape or may have a curved surface shape and can be appropriately determined depending on the forming method of the green multilayer body 11. For example, in the case of forming the green multilayer body by ejecting ink using the electrostatic attraction method, from the viewpoint of facilitating the movement control of the ejection nozzle, the release substrate 61 is preferably in the planar shape.

(First Step)

According to the embodiment, the green functional part 12 is formed on the temporary holding film 62. According to this step, in the ejecting apparatus, by controlling the voltage applied to the plurality of nozzles (See the single nozzle 51 shown in FIG. 3) to which the first ink is supplied, an electrostatic attraction force is applied to the first ink and the first ink is ejected onto the temporary holding film 62 formed on the release substrate 61 for printing. First, as shown in FIG. 4, the release substrate 61 and the temporary holding film 62 formed thereon are placed on a table (not shown) of the ejecting apparatus. Moving the table by a predetermined amount while ejecting ink makes a plurality of figures drawn on the temporary holding film 62. When the application of the voltage is stopped, the ejection of the ink is stopped, and the drawing is stopped. By repeating these processes, it is possible to simultaneously firm a plurality of green functional parts 12 (see FIG. 3) of a desired shape, a rectangular shape in this embodiment.

(Second Step)

In the second step, the table is moved by a predetermined amount in Y-axis direction so that the nozzle filled with the second ink is positioned above the green functional part formed in the first step. Alternatively, the nozzle may be moved such that the table is fixed, and the nozzle filled with the second ink is located above the green functional part formed in the first step.

Figure 3:
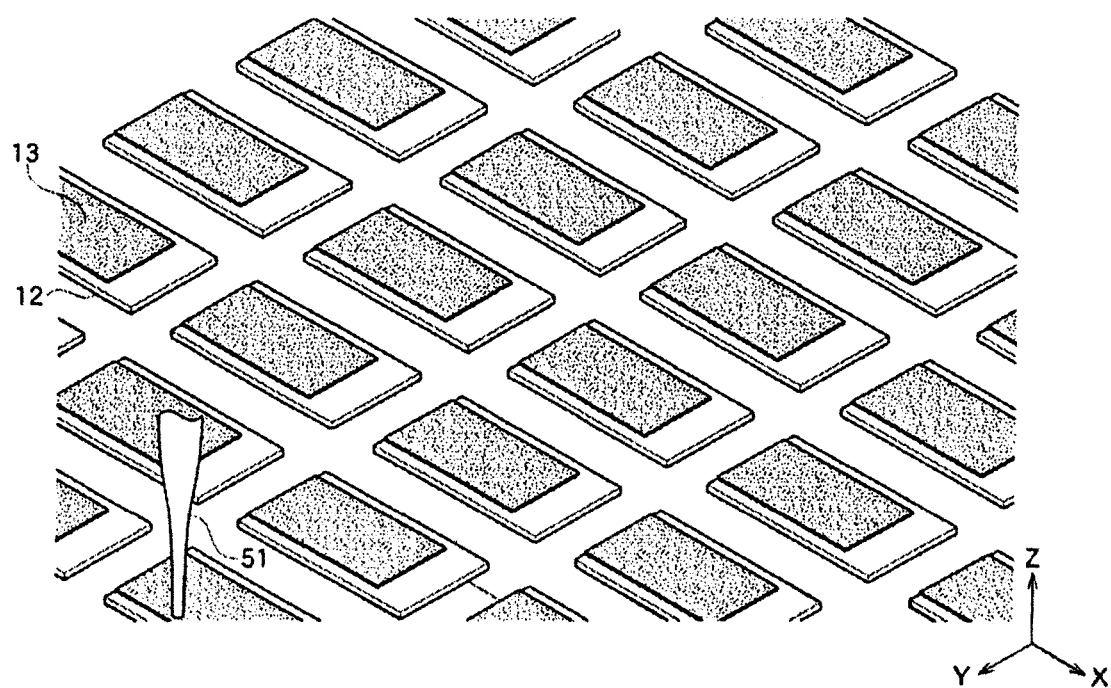
FIG. 3 is a perspective view for explaining the second step that can be processed in the manufacturing method according to the embodiment.

After drying the green functional part formed in the first step, as shown in FIG. 3, as is the same in the first step, a predetermined length of a line segment is formed by using the second ink on the green functional part 12. By repeating thereof, a rectangular area (the green conductor part 13) in which a predetermined number of the line segments having a predetermined length are formed. FIG. 3 only shows the tip part of the nozzle 51.

In the case of adopting the electrostatic attraction method, in the first and the second steps, the line width of the line segment formed using the ink is approximately 5 to 50 μm. Then, the line segments having a predetermined length are repeatedly formed to be parallel and continuously connected by bringing line segments into contact with each other, so that a surface area having one thickness can be formed.

Example methods of forming the rectangular area are as follows. Line segments may be formed in parallel along the short side direction or the long side direction of the rectangular area to be formed, making the rectangular area. The line segments may be formed in the diagonal direction of the rectangular area and the rectangular area may be formed by changing the length of the line segment to be formed.

In the embodiment, an example is described in which the green functional part and the green conductor part for determining the outer shape of the device are formed in a rectangular shape. However, if a desired electronic component is requested, the outer shape or the shape of the green conductor part may have a polygonal shape, such as a hexagonal shape or an octagonal shape, or a circular shape as a basic shape.

(Step of Forming Green Multilayer Body)

The formation of the green conductor part on the green functional part and the formation of the green functional part on the green conductor part by the first and the second steps described above are repeated, and the green multilayer body in which the green functional part and the green conductor part are alternately laminated can be obtained.

As described above, in the case of using the ejecting apparatus utilizing electrostatic attraction force, by forming a plurality of line segments in parallel and connected to each other, the green functional part and the green conductor part each having desired area are formed. The thickness of the green functional part and the same of the green conductor part are controlled by adjusting the line width and the pitch width between the lines, thereby unevenness in thickness within the plane is suppressed. Therefore, the line width is adjusted according to the length in the short side direction of the green functional part and the same of the green conductive part, making the line width becomes ½ or less of the length in the short side direction.

Furthermore, in the case of using the ejecting apparatus utilizing electrostatic attraction force, the formation accuracy of the obtained green multilayer body is high since the green functional part and the green conductor part are formed and laminated with high accuracy. Therefore, when viewing the green multilayer body from the laminated direction, it is possible to enlarge an area where each green conductor part overlaps. Further, the unevenness in the thickness direction of the printed area can be extremely small.

The method of forming the green multilayer body by ejecting the ink by the electrostatic attraction method described above is an example of the embodiment and is not limited thereto. In order to form the green multilayer body having smaller size, it is preferable to use the method of ejecting ink by the electrostatic attraction method, however, the other ink jet method or the dispenser method may be used if the green multilayer body of a desired size is obtainable.

(Step of Obtaining Element Body)

According to the embodiment, the element body 10 included in the multilayer electronic component is manufactured by treating the multilayer body obtained by heat treating the green multilayer body formed on the temporary holding film.

Figure 5:
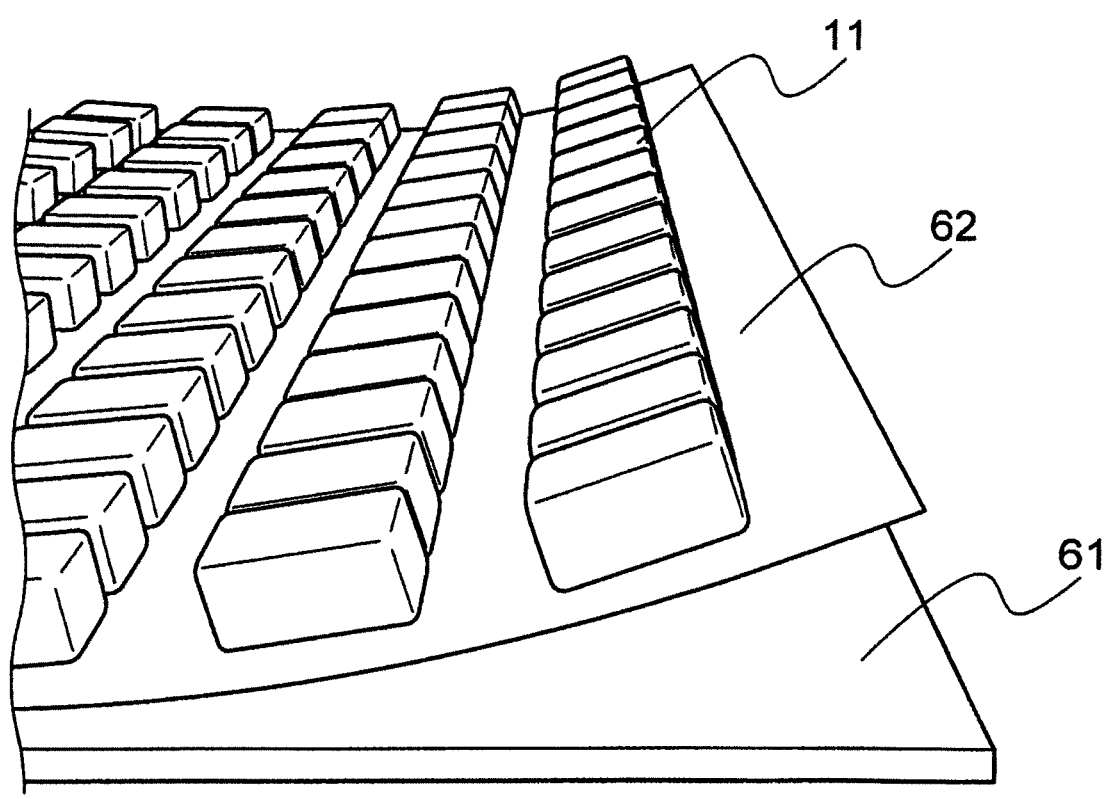
FIG. 5 is a view for explaining a step of releasing the temporary holding film together with the green multilayer body from the release substrate according to the embodiment.
Figure 6:
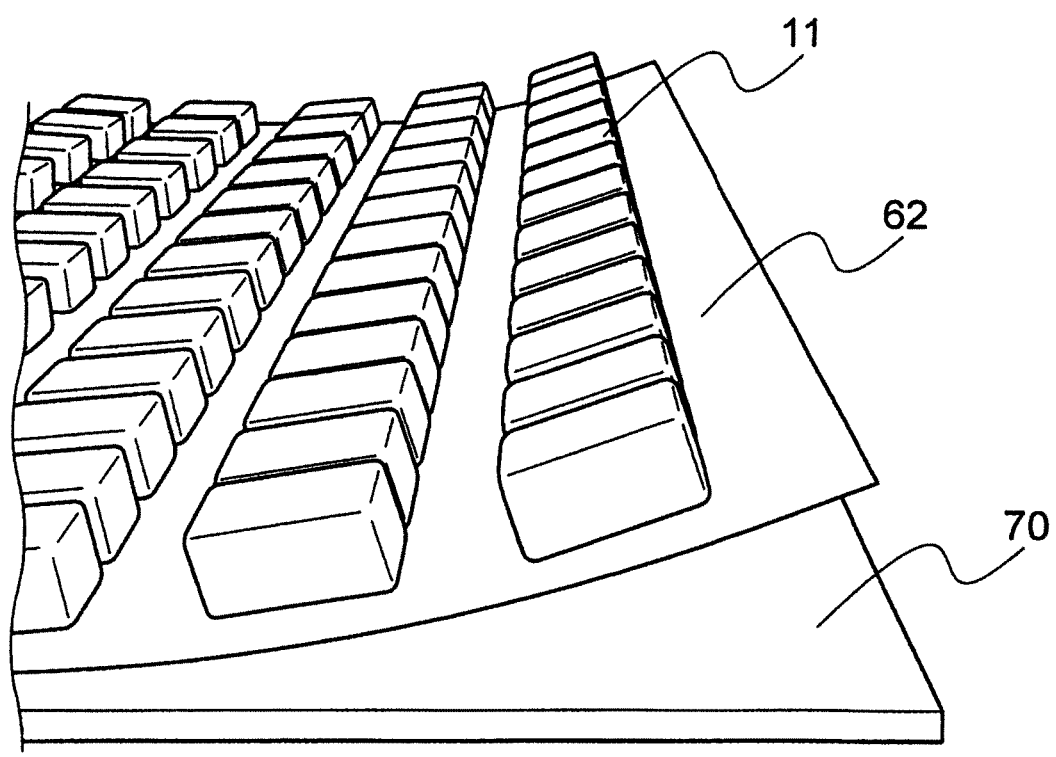
FIG. 6 is a schematic diagram showing a green multilayer body, a temporary holding film and a heat resistant substrate according to the embodiment.

The embodiment includes, before the heat treatment step, the step of releasing the temporary holding film from the release substrate and the step of transferring the green multilayer body together with the temporary holding film to the heat resistant substrate. In the step of releasing the temporary holding film from the release substrate, as shown in FIG. 5, the temporary holding film 62 can be released from the release substrate 61 together with the green multilayer body. Then, as shown in FIG. 6, the green multilayer body 11 formed on the temporary holding film 62 is transferred to the heat resistant substrate 70 together with the temporary holding film 62.

In the embodiment, the green multilayer body 11 is heat treated on the heat resistant substrate 70. The setters are preferably used as the heat resistant substrate 70. As the setter, for example, a setter made of ceramics including one or more materials selected from the group of alumina, silica, magnesia, and zirconia can be used.

The binder removal treatment, the firing treatment, the annealing treatment, etc. are exemplified as the heat treatment step. By the heat treatment, the functional particles contained in the green functional part of the green multilayer body are integrated to become the functional part and a sintered multilayer body is obtained. The heating temperature and the heating time in the heat treatment step may be appropriately set so that the green multilayer body can be sintered.

In the embodiment, the temporary holding film 62 is thermally decomposed by a series of heat treatment steps. Preferably, the temporary holding film is thermally decomposed and burned off in the binder removal treatment and the firing treatment. More preferably, the temporary holding film is thermally decomposed in the binder removal treatment and burned off.

In the embodiment, by heat treating the green multilayer body, sintered multilayer body can be obtained. In the case where the obtained multilayer body is used as the element body, treatments such as formation of a terminal electrode or the like is carried out as necessary to manufacture a multilayer electronic component.

In the embodiment, the green multilayer body is preferably formed as a green chip corresponding to the shape and the size of the element body. In other words, the green functional parts are preferably formed to be separated pattern corresponding to the shape and size of the element body after firing. The green conductive parts are also preferably formed to be separated pattern corresponding to the shape and size of the element body after firing. By forming the green multilayer body as a green chip in which the green multilayer body is separated from the beginning, it is possible to omit a step of cutting the green multilayer body into separated plural green chips. That is, the element body can be obtained by heat treatment without cutting the green multilayer body. Since the green chip shrinks during the heat treatment to become the element body, the size of the green chip is larger than the size of the element body.

Further, before the heat treatment, the green multilayer body, formed to have a larger size than that of the green chip, may be cut and separated to obtain plural green chips. In addition to the above described treatment, a known processing may be performed on the green multilayer body.

SUMMARY OF THE EMBODIMENT

In this embodiment, as shown in FIG. 4, by forming the green multilayer body 11 on the temporary holding film 62, bleeding or repelling of the ink can be small and an excellent forming accuracy can be secured. In addition, it is possible to reduce sticking of the sintered multilayer body onto the heat resistant substrate such as the setter.

In addition, according to the manufacturing method of the embodiment, the green multilayer body 11 can be transferred while being disposed on the temporary holding film 62. Further, since the temporary holding film 62 can be burned off in the process of heat treatment, it is not necessary to separate the green multilayer body 11 from the temporary holding film 62 before the heat treatment step, and the process can be simplified.

In the embodiment, by using the temporary holding film 62 having the breaking strength of 1 N/m or more and the breaking elongation of 3% or more, it is possible to easily release the temporary holding film 62 in the step of releasing the temporary holding film 62 from the release substrate 61. Further, in the step of transferring the green multilayer body 11 to the heat resistant substrate 70 together with the temporary holding film 62, the green multilayer body 11 can easily be transferred to the heat resistant substrate 70 such as the setter without causing breakage or the like to the temporary holding film 62.

As shown in the embodiment, by respectively forming the green functional parts and the green conductive parts to a separated pattern corresponding to the shape and the size of the element body after firing, the green multilayer body 11 is formed as a green chip corresponding to the shape and the size of the element body. Thus, it is possible to omit the step of cutting and separating the green multilayer body 11 into plural green chips.

Particularly, according to the method of the embodiment, since the temporary holding film 62 has conductivity, prevention of charging the temporary holding film 62 can be realized. Therefore, when the temporary holding film 62 on which the green multilayer body 11 is formed in a predetermined pattern is released from such as the release substrate 61, the temporary holding film 62 can be easily released from the release substrate 61. And it is possible to effectively prevent the release residue, which is the temporary holding film 62 with the green multilayer body 11 remaining on the release substrate. In particular, since the surface of the temporary holding film 62 having conductivity is difficult to be charged, it is possible to efficiently manufacture the green multilayer body 11 of a predetermined pattern on the temporary holding film 62 with high response and high accuracy by an electrostatic attraction method.

Further, since the temporary holding film 62 is made of a resin film containing carbon particles in the resin film, the surface charge can be suppressed, and the yield of release can be further improved. Also, by containing the carbon particles in the resin film, the resin film is controlled to have the porous structure (the structure including pores), a moderate unevenness is formed on the surface thereof, the landing of the first or the second ink is improved, and an occurrence of the ink bleeding is also effectively suppressed. The surface roughness Ra (JIS B 0601: 2001) of the temporary holding film 62 is preferably 0.01 to 0.5 μm. Within this range, the occurrence of the ink bleeding is also suppressed, and the drawability is also improved.

Modified Embodiments

In the above-described embodiment, the multilayer ceramic capacitor is exemplified as the multilayer electronic component, but various multilayer electronic components are exemplified according to the material constituting the functional layer. Specifically, multilayer varistors, multilayer thermistors, multilayer piezoelectric elements, multilayer inductors, etc. are exemplified. In the case of a multilayer varistor or a multilayer thermistor, the functional layer is made of a semiconductor ceramic layer, and in the case of a multilayer piezoelectric device, the functional layer is made of a piezoelectric ceramic layer, and in the case of a multilayer inductor, the functional layer is made of a ferrite layer or a soft magnetic metal layer. Further, the material constituting the conductor part is determined according to the material of the functional part.

Further, in the above embodiment, the shape and materials of the green functional part and those of the green conductor part are identical, however, for example, the green multilayer body of the multilayer inductor can be formed by the following methods. The coil conductor may be formed by combining rectangular areas, and each green conductor part may be formed by overprinting the green conductor parts whose shapes are different from each other, or by overprinting the cross section thereof so as to form a spiral shape manufacturing a spiral conductor part. Alternatively, in the case of forming the green multilayer body of a multilayer composite electronic component, it is preferable to use two or more kinds as the material of the functional particles constituting the green functional part and the material of the conductive particles constituting the green electric conductor part.

As the temporary holding film 62 and the green multilayer body 11 released from the release substrate 61 shown in FIG. 5, the above embodiment exemplified the following. As shown in FIG. 6, the green multilayer body 11 is heat treated to be in contact with the heat resistant substrate 70 via the temporary holding film 62. However, for example, heat treatment may be performed so that the green multilayer body 11 directly contacts the heat resistant substrate 70. That is, in the heat treatment step, the green multilayer body 11 may be heat treated so as to be sandwiched between the temporary holding film 62 and the heat resistant substrate 70 in a vertical direction.

Further, in the above embodiment, the temporary holding film 62 having conductivity is released from the release substrate 61 as shown in FIG. 5, and then the temporary holding film 62 is heat treated after transferring onto the substrate 70 as shown in FIG. 6, but the present invention is not limited thereto. For example, the temporary holding film 62 having conductivity is directly formed on the surface of the substrate 70, and the green multilayer body 11 is formed on the temporary holding film 62 by the above described method, then it may be heat treated.

The embodiment of the present invention has been described above, however, the present invention is not limited thereto, and modifications may be made in various aspects within the scope of the invention.

EXAMPLE

Hereinafter, the present invention will be described in detail by way of examples, but the present invention is not limited thereto.

Example 1

A resin film having a thickness of 20 μm was prepared on a stainless steel plate (a release substrate) by using a resin vehicle obtained by dissolving a butyral resin in methyl ethyl ketone (MEK) and referred to as the temporary holding film. Carbon particles having a particle diameter of 0.02 to 2 μm were contained in the resin film in an amount of 30 to 80 volume %, and the sheet resistance of the temporary holding film was 10 MΩ/□ or less. In addition, the breaking strength of the holding film was 1 N/m or more, and the breaking elongation was 3% or more.

On the temporary holding film 62 made of the resin film, a printing by the first ink and a printing by the second ink were repeated by the electrostatic attraction method, and green multilayer body 11 shown in FIG. 4 are formed in matrix. The size of each green multilayer body 11 was 460 μm×220 μm×150 μm.

When forming the green multilayer body, using the ejection apparatus of an electrostatic attraction method having a plurality of nozzles filled with the first ink and a plurality of nozzles filled with the second ink, the dielectric layer as the green functional part and the internal electrode layer as the green conductor part were alternately laminated on the temporary holding film 62 to form the green multilayer body having the internal electrode of 75 layers. The size of the dielectric layer was 220 μm in the short side direction and 460 μm in the long side direction. Further, the size of the internal electrode layer was 140 μm in the short side direction.

The drawability of the first ink and the same of the second ink on the temporary holding film was confirmed. There was no ink bleeding into the temporary holding film and the size variation of the ink drawing was within plus or minus 5 μm, which was small.

Then, the temporary holding film 62 on which green multilayer body 11 is formed, was released from the stainless steel plate. This release test was carried out for 10 pieces of the temporary holding film, and it was confirmed that all the temporary holding films could be satisfactorily released without tearing.

Reference Example 1

The green multilayer body was formed on the temporary holding film in the same manner as in Example 1, except that a resin film not containing carbon particles was used as the temporary holding film (the sheet resistance is 100 GΩ/☐ or more) and subjected to the release test.

In the release test, 3 films out of 10 temporary holding films were confirmed that the temporary holding films remain on the substrate.

DESCRIPTION OF THE REFERENCE NUMERAL

1 Multilayer ceramic capacitor
10 Element body
  2 Ceramic layer
  3 Internal electrode layer
  4 Terminal electrodes
11 Green multilayer body
  12 Green functional part
  13 Green conductor part
51 Nozzle
61 Release substrate
62 Temporary holding film
70 Heat resistant substrate

What is claimed is:

1. A method for manufacturing a multilayer electronic component having an element body in which a functional part and a conductor part are laminated, comprising
a step of forming a green multilayer body on a temporary holding film, wherein
the green multilayer body is formed by repeating a first step of forming a green functional part using a first ink containing a functional particle and a second step of forming a green conductor part using a second ink containing a conductive particle,
the temporary holding film has conductivity,
the first ink and/or the second ink is ejected by an ejecting apparatus,
the temporary holding film contains particles having conductivity in a resin film,
particle diameters of the particles having conductivity are from 0.02 to 2 μm, and
a volume percentage of the particles having conductivity is from 30 to 80 volume %.

2. The method for manufacturing the multilayer electronic component according to claim 1, wherein a sheet resistance of the temporary holding film is 10 MΩ per square or less.

3. The method for manufacturing the multilayer electronic component according to claim 1, further comprising
a step of releasing the temporary holding film with the green multilayer body from a release substrate, after forming the green multilayer body on the temporary holding film formed on the release substrate.

4. The method for manufacturing the multilayer electronic component according to claim 1, further comprising
a step of heat treating the green multilayer body formed on the temporary holding film, together with the temporary holding film, resulting in a thermal decompose of the temporary holding film.

5. The method for manufacturing the multilayer electronic component according to claim 1, wherein the ejecting apparatus comprises a first head part including nozzles to which the first ink is supplied for ejection and a second head part including nozzles to which the second ink is supplied for ejection.

6. A method for manufacturing a multilayer electronic component having an element body in which a functional part and a conductor part are laminated, comprising
a step of forming a green multilayer body on a temporary holding film, wherein
the green multilayer body is formed by repeating a first step of forming a green functional part using a first ink containing a functional particle and a second step of forming a green conductor part using a second ink containing a conductive particle, and
the temporary holding film has conductivity and any of (i) a breaking strength of 1 N/m or more, (ii) a break elongation of 3% or more, or (iii) a porous structure,
the temporary holding film contains particles having conductivity in a resin film,
particle diameters of the particles having conductivity are from 0.02 to 2 μm, and
a volume percentage of the particles having conductivity is from 30 to 80 volume %.

7. The method for manufacturing the multilayer electronic component according to claim 6, wherein the breaking strength of the temporary holding film is 1 N/m or more.

8. The method for manufacturing the multilayer electronic component according to claim 6, wherein the break elongation of the temporary holding film is 3% or more.

9. The method for manufacturing the multilayer electronic component according to claim 6, wherein the temporary holding film has the porous structure.

10. A method for manufacturing a multilayer electronic component having an element body in which a functional part and a conductor part are laminated, comprising
a step of forming a green multilayer body on a temporary holding film, wherein
the green multilayer body is formed by repeating a first step of forming a green functional part using a first ink containing a functional particle and a second step of forming a green conductor part using a second ink containing a conductive particle, the temporary holding film has conductivity,
(i) the green functional part and the green conductor part each have a separated pattern corresponding to the shape and size of the element body after firing and/or (ii) the green functional part and/or the green conductor part is formed by an electrostatic attraction method,
the temporary holding film contains particles having conductivity in a resin film,
particle diameters of the particles having conductivity are from 0.02 to 2 µm, and
a volume percentage of the particles having conductivity is from 30 to 80 volume %.

11. The method for manufacturing the multilayer electronic component according to claim 10, wherein the green functional part and the green conductor part each have the separated pattern corresponding to the shape and size of the element body after firing.

12. The method for manufacturing the multilayer electronic component according to claim 10, wherein the green functional part is formed by the electrostatic attraction method.

13. The method for manufacturing the multilayer electronic component according to claim 10, wherein the green conductor part is formed by the electrostatic attraction method.

14. A method for manufacturing a multilayer electronic component having an element body in which a functional part and a conductor part are laminated, comprising
a step of forming a green multilayer body on a temporary holding film, wherein the green multilayer body is formed by repeating a first step of forming a green functional part using a first ink containing a functional particle and a second step of forming a green conductor part using a second ink containing a conductive particle,
the temporary holding film has conductivity,
the temporary holding film contains particles having conductivity in a resin film,
particle diameters of the particles having conductivity are from 0.02 to 2 µm, and
a volume percentage of the particles having conductivity is from 30 to 80 volume %.

15. The method for manufacturing the multilayer electronic component according to claim 14, wherein a sheet resistance of the temporary holding film is 10 MΩ per square or less.

16. The method for manufacturing the multilayer electronic component according to claim 14, further comprising
a step of releasing the temporary holding film with the green multilayer body from a release substrate, after forming the green multilayer body on the temporary holding film formed on the release substrate.

17. The method for manufacturing the multilayer electronic component according to claim 14, further comprising
a step of heat treating the green multilayer body formed on the temporary holding film, together with the temporary holding film, resulting in a thermal decompose of the temporary holding film.

* * * * *